(12) United States Patent
Hwang (10) Patent No.: US 9,317,500 B2
(45) Date of Patent: Apr. 19, 2016

(54) SYNCHRONIZING TRANSLATED DIGITAL CONTENT

(75) Inventor: Douglas Hwang, New York, NY (US)

(73) Assignee: Audible, Inc., Newark, NJ (US)

( * ) Notice: Subject to any disclaimer, the term of this patent is extended or adjusted under 35 U.S.C. 154(b) by 180 days.

(21) Appl. No.: 13/483,883

(22) Filed: May 30, 2012

(65) Prior Publication Data

US 2014/0250219 A1    Sep. 4, 2014

(51) Int. Cl.
*G06F 15/173*    (2006.01)
*G06F 17/28*    (2006.01)
*G06Q 30/02*    (2012.01)

(52) U.S. Cl.
CPC ........ *G06F 17/2827* (2013.01); *G06Q 30/0241* (2013.01)

(58) Field of Classification Search
CPC . G06F 17/2755; G06F 17/28; G06F 17/2818; G06F 17/2827; G06F 17/2836; G06F 17/2854; G06F 17/2872; G06F 17/289; G06F 17/30371; G06F 8/30; G06F 8/35; G06F 8/73; G06F 9/4448; G06F 9/45537; G06Q 10/10; G06Q 30/0241; G10L 15/265; G10L 19/018
USPC ........................................................ 709/219
See application file for complete search history.

(56) References Cited

U.S. PATENT DOCUMENTS

| | | | |
|---|---|---|---|
| 5,203,705 A | 4/1993 | Hardy et al. | |
| 5,351,189 A * | 9/1994 | Doi et al. | 704/3 |
| 5,608,622 A * | 3/1997 | Church | 704/3 |
| 5,657,426 A | 8/1997 | Waters et al. | |
| 5,737,489 A | 4/1998 | Chou et al. | |
| 5,978,754 A * | 11/1999 | Kumano | 704/3 |
| 6,208,956 B1* | 3/2001 | Motoyama | 704/2 |
| 6,356,922 B1 | 3/2002 | Schilit et al. | |
| 6,766,294 B2 | 7/2004 | MaGinite et al. | |
| 6,829,759 B1* | 12/2004 | Davis et al. | 717/140 |
| 6,912,505 B2 | 6/2005 | Linden et al. | |
| 7,107,533 B2 | 9/2006 | Duncan et al. | |
| 7,231,351 B1 | 6/2007 | Griggs | |
| 8,106,285 B2 | 1/2012 | Gerl et al. | |

(Continued)

FOREIGN PATENT DOCUMENTS

| | | |
|---|---|---|
| CN | 103988193 A | 8/2014 |
| EP | 2689346 | 1/2014 |

(Continued)

OTHER PUBLICATIONS

Arar, Y., Blio E-Book Platform: No Reader (Yet), But Great Graphics, Jan. 7, 2010.

(Continued)

*Primary Examiner* — Christopher Biagini
(74) *Attorney, Agent, or Firm* — Knobbe Martens Olson & Bear LLP (57) ABSTRACT

Aspects of the present disclosure relate to one or more configured computing systems identifying when content includes a base content and a translated content that can be synchronously presented. Once a content match is identified, a device to receive synchronization information can also be identified. The synchronization information can enable one or more devices to synchronously present translated content while consuming a base content. For example, an English language audio book may be output synchronously with a Spanish language eBook.

32 Claims, 5 Drawing Sheets

(56) References Cited

U.S. PATENT DOCUMENTS

| | | | |
|---|---|---|---|
| 8,109,765 B2 | 2/2012 | Beattie et al. | |
| 8,131,545 B1 | 3/2012 | Moreno et al. | |
| 8,131,865 B2 | 3/2012 | Rebaud et al. | |
| 8,296,124 B1* | 10/2012 | Holsztynska et al. | 704/2 |
| 8,442,423 B1 | 5/2013 | Ryan et al. | |
| 8,548,618 B1 | 10/2013 | Story, Jr. et al. | |
| 8,577,668 B2* | 11/2013 | Rosart et al. | 704/2 |
| 2002/0002459 A1 | 1/2002 | Lewis et al. | |
| 2002/0007349 A1 | 1/2002 | Yuen | |
| 2002/0041692 A1 | 4/2002 | Seto et al. | |
| 2002/0116188 A1 | 8/2002 | Amir et al. | |
| 2003/0061028 A1 | 3/2003 | Dey et al. | |
| 2003/0083885 A1 | 5/2003 | Frimpong-Ansah | |
| 2003/0115289 A1 | 6/2003 | Chinn et al. | |
| 2004/0002848 A1* | 1/2004 | Zhou et al. | 704/2 |
| 2004/0261093 A1 | 12/2004 | Rebaud et al. | |
| 2006/0148569 A1 | 7/2006 | Beck | |
| 2006/0217956 A1* | 9/2006 | Nagao et al. | 704/2 |
| 2007/0016314 A1 | 1/2007 | Chan et al. | |
| 2007/0050182 A1* | 3/2007 | Sneddon et al. | 704/2 |
| 2007/0061487 A1 | 3/2007 | Moore et al. | |
| 2007/0136459 A1 | 6/2007 | Roche et al. | |
| 2007/0276657 A1 | 11/2007 | Gournay et al. | |
| 2008/0177822 A1 | 7/2008 | Yoneda | |
| 2008/0294453 A1 | 11/2008 | Baird-Smith et al. | |
| 2009/0047003 A1 | 2/2009 | Yamamoto | |
| 2009/0136213 A1 | 5/2009 | Calisa et al. | |
| 2009/0222520 A1 | 9/2009 | Sloo et al. | |
| 2009/0228570 A1 | 9/2009 | Janik et al. | |
| 2009/0233705 A1 | 9/2009 | Lemay et al. | |
| 2009/0276215 A1 | 11/2009 | Hager | |
| 2009/0305203 A1 | 12/2009 | Okumura et al. | |
| 2009/0319273 A1 | 12/2009 | Mitsui et al. | |
| 2010/0042682 A1 | 2/2010 | Kaye | |
| 2010/0042702 A1 | 2/2010 | Hanses | |
| 2010/0064218 A1 | 3/2010 | Bull et al. | |
| 2010/0070575 A1 | 3/2010 | Bergquist et al. | |
| 2010/0279822 A1 | 11/2010 | Ford | |
| 2010/0286979 A1 | 11/2010 | Zangvil et al. | |
| 2010/0287256 A1 | 11/2010 | Neilio | |
| 2011/0067082 A1 | 3/2011 | Walker | |
| 2011/0087802 A1 | 4/2011 | Witriol et al. | |
| 2011/0093254 A1* | 4/2011 | Kuhn et al. | 704/2 |
| 2011/0119572 A1 | 5/2011 | Jang et al. | |
| 2011/0177481 A1 | 7/2011 | Haff et al. | |
| 2011/0184738 A1 | 7/2011 | Kalisky et al. | |
| 2011/0191105 A1 | 8/2011 | Spears | |
| 2011/0231474 A1 | 9/2011 | Locker et al. | |
| 2011/0246175 A1* | 10/2011 | Yi et al. | 704/3 |
| 2011/0288861 A1 | 11/2011 | Kurzweil et al. | |
| 2011/0288862 A1 | 11/2011 | Todic | |
| 2011/0296287 A1 | 12/2011 | Shahraray et al. | |
| 2012/0030288 A1 | 2/2012 | Burckart et al. | |
| 2012/0109640 A1 | 5/2012 | Anisimovich et al. | |
| 2012/0123766 A1* | 5/2012 | Anisimovich et al. | 704/3 |
| 2012/0150935 A1 | 6/2012 | Frick et al. | |
| 2012/0166180 A1 | 6/2012 | Au | |
| 2012/0197998 A1 | 8/2012 | Kessel et al. | |
| 2012/0245719 A1 | 9/2012 | Story, Jr. et al. | |
| 2012/0245721 A1 | 9/2012 | Story, Jr. et al. | |
| 2012/0303352 A1* | 11/2012 | Coen et al. | 704/2 |
| 2012/0310642 A1 | 12/2012 | Cao et al. | |
| 2012/0315009 A1 | 12/2012 | Evans et al. | |
| 2012/0324324 A1 | 12/2012 | Hwang et al. | |
| 2013/0041747 A1 | 2/2013 | Anderson et al. | |
| 2013/0073449 A1 | 3/2013 | Voynow et al. | |
| 2013/0073675 A1 | 3/2013 | Hwang et al. | |
| 2013/0074133 A1 | 3/2013 | Hwang et al. | |
| 2013/0130216 A1 | 5/2013 | Morton et al. | |
| 2013/0257871 A1 | 10/2013 | Goldstein et al. | |
| 2013/0262127 A1 | 10/2013 | Goldstein et al. | |
| 2014/0005814 A1 | 1/2014 | Hwang et al. | |
| 2014/0039887 A1 | 1/2014 | Dzik et al. | |
| 2014/0040713 A1 | 2/2014 | Dzik et al. | |
| 2014/0223272 A1 | 8/2014 | Arora et al. | |

FOREIGN PATENT DOCUMENTS

| | | |
|---|---|---|
| JP | 2002-140085 | 5/2002 |
| JP | 2005-189454 | 7/2005 |
| NZ | 532174 | 1/2007 |
| WO | WO 2006/029458 A1 | 3/2006 |
| WO | WO 2011/144617 A1 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Beattie, V., et al., Reading Assistant: Technology for Guided Oral Reading, Scientific Learning, Apr. 10, 2012, 5 pages.

Dzik, S.C., U.S. Appl. No. 13/604,482, filed Sep. 5, 2012, entitled Identifying Corresponding Regions of Content.

Dzik, S.C., U.S. Appl. No. 13/604,486, filed Sep. 5, 2012, entitled Selecting Content Portions for Alignment.

Dzik, S.C., U.S. Appl. No. 13/662,306, filed Oct. 26, 2012, entitled Content Presentation Analysis.

Feature: Synched Audio and Text, Enhanced Editions, Aug. 31, 2009, last accessed Nov. 15, 2012, available at http://www.enhanced-editions.com/blog/2009/08/enhanced-editions-features-exclusive-soundtracks-and-extracts/.

Hwang, D.C., et al., U.S. Appl. No. 13/536,711, filed Jun. 28, 2012, entitled Pacing Content.

International Search Report issued in connection with International Patent Application No. PCT/US12/30198 mailed on Jun. 20, 2012, 16 pages.

Levinson, S.E., et al., Continuous Speech Recognition from a Phonetic Transcription, Acoustics, Speech, and Signal Processing, Apr. 1990, pp. 190-199.

Roub, P., I'll Buy an E-book Reader When . . . , Nov. 16, 2007, available at: http://roub.net/blahg/2007/11/16/ill-buy-an-eboo/ (accessed Sep. 6, 2012), 2 pages.

Vignoli, F., et al., A Text-Speech Synchronization Technique With Applications to Talking Heads, Auditory-Visual Speech Processing, ISCA Archive, Aug. 7-10, 1999.

Weber, F.V., U.S. Appl. No. 13/531,376, filed Jun. 22, 2012, entitled Modelling Expected Errors for Discriminative Training.

U.S. Appl. No. 13/070,313, Synchronizing Digital Content, filed Mar. 23, 2011.

U.S. Appl. No. 13/552,548, Synchronizing Digital Content, filed Jul. 18, 2012.

U.S. Appl. No. 13/535,240, Managing Related Digital Content, filed Jun. 27, 2012.

U.S. Appl. No. 13/535,264, Managing Related Digital Content, filed Jun. 27, 2012.

U.S. Appl. No. 13/602,012, Synchronized Digital Content Samples, filed Aug. 31, 2012.

U.S. Appl. No. 13/570,179, Synchronizing Recorded Audio Content and Companion Content, filed Aug. 8, 2012.

U.S. Appl. No. 13/070,422, Managing Playback of Synchronized Content, filed Mar. 23, 2011.

U.S. Appl. No. 13/070,421, Managing Playback of Synchronized Content, filed Mar. 23, 2011.

U.S. Appl. No. 13/070,439, Managing Playback of Synchronized Content, filed Mar. 23, 2011.

U.S. Appl. No. 13/604,482, Identifying Corresponding Regions of Content, filed Sep. 5, 2012.

U.S. Appl. No. 13/604,486, Selecting Content Portions for Alignment, filed Sep. 5, 2012.

U.S. Appl. No. 13/758,749, Selective Synchronous Presentation, filed Feb. 4, 2013.

International Search Report issued in connection with International Patent Application No. PCTUS12/30186 mailed on Jun. 20, 2012, 12 pages.

(56) References Cited

OTHER PUBLICATIONS

International Preliminary Report on Patentability issued in connection with international Patent Application No. PCT/US12/30198 mailed on Jan. 30, 2014, 8 pages.

International Search Report and Written Opinion in PCT/US2013/042903 mailed Feb. 7, 2014.

International Search Report issued in connection with International Application No. PCT/US13/53020 mailed on Dec. 16, 2013.

International Search Report and Written Opinion issued in connection with International Patent Application No. PCT/US2013/042903 mailed Feb. 7, 2014.

International Search Report and Written Opinion in PCT/US2014/014508 mailed Jun. 25, 2014.

* cited by examiner

SYNCHRONIZING TRANSLATED DIGITAL CONTENT

BACKGROUND

Generally described, computing devices and communication networks facilitate the collection and exchange of information. In a common application, computing devices, such as personal computing devices, can utilize a wide area communication network, generally referred to as the Internet, to access content or other data from other computing devices associated with content providing entities. The specific design/function of each computing device can vary the type of content exchanged between the computing devices.

Users can request data from a content providing entity so that the content is delivered to one or more computing devices in a relatively "real time" basis. For example, users can request content from a network resource (e.g., a Web site, Web service, or cloud node) for immediate presentation on a computing device display screen or they can request the immediate transfer of content, such as a document or data file, from a network resource or Web service for storage on the computing device. In another example, users can transmit a request, or initiate a transaction, that results in the downloading or streaming of content to a computing device. Typically, the content providing entity would initiate the transfer upon receipt of the request from the computing device.

In one application, various computing devices associated with a user or a user account may have access to different representations of companion content in different languages, alphabets, or dialects. For example, a user may obtain a digital representation of content (e.g., an electronic book or "eBook") in a first language, such as English, that can be presented on a computing device (e.g., and eBook reader). This content may be referred to as a "base" content. The same user may also obtain a separate translated representation of the same or similar content (e.g., a corresponding Spanish language audio book). This content may be referred to as a "translated" content. The translated content may be obtained at a different time and/or from a different source than the base content. As a result, the base content and the translated content can be decoupled from one another, and additional features related to the synergy of the base content and the translated content (collectively, the "companion content") are not readily available to computing devices utilized by the user or associated with the user's account maintained by a content provider.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to the management of translated content and/or information related to the content. Specifically, aspects of the present disclosure relate to presenting translated content based on a synchronized base content. For example, a user may utilize a computing device, such as an eBook reader, to obtain access to a base content (e.g., an eBook) in a first language. The user may further obtain access to corresponding translated content (e.g., another eBook or an audio book) in a second language that can be synchronously rendered. For example, the user may read the eBook in the first language while having the translated audio content synchronously output (e.g., via a speaker or to other computing devices). Such translated output may, for example, facilitating learning and understanding another language. In some embodiments, the output of translated companion content may be utilized by multiple users. For example, a first user may read an eBook in a first language while corresponding translated audio content is output to other users in a variety of languages. Illustratively, a public reading of a novel or other content could be simultaneously output in different languages based on the understanding of each listener. In some embodiments, each listener may also utilize a computing device which outputs their corresponding content.

As a first example, a user may first obtain a copy of an eBook, such as a digital representation of *El ingenioso hidalgo don Quijote de la Mancha*, the Spanish language version of the novel known in English as *The Ingenious Gentleman Don Quixote of La Mancha* (which are both referred herein generally as "*Don Quixote*"). At the same or a different time, the user may obtain a copy of the corresponding English language audio book, which may be referred to herein generally as translated content. Both of these items of content may be made available on a computing device of the user. In some embodiments, after identifying the base content and the translated content (which may generally be referred to herein as "companion content") on the user's device, a translated content management system can cause content synchronization information corresponding to the companion content to be transmitted to the device. With the companion content and the content synchronization information available on the same device, the user's device can synchronously render the companion content to provide the user with an enhanced experience. An embodiment of a system for obtaining synchronization information for companion content may be found in U.S. patent application Ser. No. 13/070,313, filed Mar. 23, 2011, entitled "SYNCHRONIZING DIGITAL CONTENT," which is hereby incorporated by reference in its entirety (hereinafter, the '313 application). For instance, the user may read the text *Don Quixote*, and the user's device may simultaneously output the translated English audio content.

Though described above with respect to a single user device, in some embodiments, multiple user devices may be utilized to output multiple items of translated content. For example, in the example above, the user may be a Spanish speaker, but wish to read *Don Quixote* out loud to a number of English language listeners. As such, each listener may be equipped with an output device (e.g., individualized headphones, speakers, or computing devices). As the user reads *Don Quixote* on the user's device, each listener's device may output synchronized translated content (e.g., the English audio recording of *Don Quixote*). This may allow a speaker of a first language to communicate content to listeners of any language for which corresponding translated content exists. One skilled in the art will appreciate that the example above may also be implemented utilizing a single device with multiple outputs (e.g., multiple speakers or headphones) for each language, or utilizing multiple computing devices. Still further, though described above with respect to audio, in some embodiments, synchronized translated content in additional formats may be output. For example, the user may read *Don Quixote* in Spanish, while a translated English text is output to other "listeners" (e.g., via personal eBook devices).

In some embodiments, a user device may provide mechanisms to maintain synchronization between a reader of a base content (e.g., content in a first language) and output of translated content. For example, as will be described in more detail below, a user device may monitor the reading of base content and attempt to modulate the speed of output of translated content in order to maintain synchronization. Illustratively, the output speed of translated audio content may be slowed or hastened in order to match the reading speed of the user. In one embodiment of a control interface, the user device may display a visual cue (e.g., a cursor) to identify a current location in a based textual content corresponding to a current output position of translated content. As the translated content is presented (i.e., as it "plays back"), the visual cue may be advanced to maintain synchronization between the output position within the translated content and a corresponding position in the textual content. The position in the textual content corresponding to the advancing output position of the translated content may be referred to herein as the advancing position in the textual content. As such, the user may be given a visual indication of the current playback position of the translated content. As will be appreciated by one skilled in the art, such a visual indication may be utilized to show an output position of translated audio content (e.g., as output by a speaker) or of translated textual content (e.g., as translated textual content is output to additional users).

In one embodiment, the current reading position in base content by a user may be monitored by physical input of the user (e.g., touch input indicating a current position). In another embodiment, the current reading position may be determined by other inputs, such as the frequency of page turns within content. In still more embodiments, non-physical inputs may be utilized to track the reading of a user. For example, the eye movement of a user may be tracked to determine a currently read word, or voice recognition may be utilized in order to determine a spoken word, sentence, paragraph, etc. The interface of a user's device may include a visual indication of the current reading position of the user.

In some embodiments, the control interface may provide a highlight or other visual indication of the distance between the current reading position of textual content and the current output position of translated content. For purposes of the present disclosure, the distance between current reading position in a base content and the current output position within translated content will be referred to herein as a lead interval. In one embodiment, the lead interval may correspond to a length of time required to advance output of the translated content corresponding to the current reading position in the base content at a normal or intended rate (e.g., a rate specified by the user or predefined by the computing device or audio content provider). In various other embodiments, the lead interval may correspond to a distance, or a number of words, letters, syllables, phonemes, spaces, sentences, paragraphs, columns, lines, rows, chapters, stanzas, sections, or other natural or predefined visual or textual feature of the base content between the current reading position in the base content and the current output position of the translated content. Based on the lead interval, a user device may change the speed at which the translated content is output. An embodiment of a system for modifying the output speed of companion content may be found in U.S. patent application Ser. No. 13/070,422, filed Mar. 23, 2011, and entitled "MANAGING PLAYBACK OF SYNCHRONIZED CONTENT," which is hereby incorporated by reference in its entirety (hereinafter, the '422 application).

In some embodiments, the base content and corresponding translated content in a companion content pair may be decoupled from each other. Companion content may be decoupled from each other, for example, by being stored on separate computing devices, by being stored in separate data stores that are not part of the same logical memory, by being obtained via different transactions, by being obtained at different times, by being obtained from different sources, or any combination thereof. For instance, a user can buy an eBook and then at a later point in time purchase an audio book version corresponding to a translated version of the eBook from a different vendor. In such cases, the user may wish to listen to the translated audio book while simultaneously reading the eBook. However, when such companion content is decoupled, it can be difficult to provide the user with a synchronous presentation experience, such as presenting portions of the translated audio book corresponding to text of the eBook presented on a display.

The decoupled nature of companion content can result in a number of difficulties for providing a user with a synchronous presentation experience. Such difficulties may include, for example, determining sources from which to obtain content information identifying the translated content, identifying that a translated content matches or is a companion to a base content, generating content synchronization information needed to synchronize presentation of the base content and translated content, providing content synchronization information to a computing device with access to the base and/or translated content, managing the storage of information related to the base and/or translated content, or any combination thereof.

Since the base content and the translated content of a companion content pair may be decoupled from each other, one or more computing devices may identify a content match, which indicates that the translated content may be a companion of the base content. Further, the one or more computing devices can also identify that a user is associated with and/or has access to the base content and the translated content. Based on determining the content match, the one or more computing devices can identify a receiving computing device associated with the user, and cause transmission of content synchronization information related to the companion content to the receiving computing device. Thereafter, the receiving computing device can utilize the content synchronization information to synchronously or simultaneously present the companion content to the user. Those skilled in the art will appreciate that more than one content may match or be a companion to another content. Accordingly, more than two individual contents may be synchronously presented without departing from the scope of the present disclosure (e.g., a base content as well as multiple translated contents). In addition, in some embodiments, one or more receiving computing devices associated with one or more users may receive the content synchronization information and utilize the content synchronization information to synchronously present the companion content.

As an illustrative, non-limiting example, a user may obtain access to companion content (e.g., an eBook formatted for an eBook reader, an audio book, and an eBook formatted for a mobile phone) that can be synchronously presented. More specifically, the user may initially obtain a base content, such as an eBook of *Don Quixote*, and store the eBook on the user's eBook reader. In some instances, the audio book of *Don Quixote* may become available after the user obtains the base content. Yet, in other instances, the audio book of *Don Quixote* may already be available when the user obtains the base content. The user may then obtain this translated content, i.e., the audio book of *Don Quixote*, via a separate transaction, which can include purchasing, lending, sharing, transferring, or any combination thereof. The separate transaction may be a purchase transaction resulting from a message that the audio book has become available or from browsing a catalog of available audio books. After the audio book and the eBook are obtained, the user may desire to synchronously listen to the audio book while viewing the eBook.

With regard to the example given above, describing both a Spanish language eBook version of *Don Quixote* and a corresponding English audio recording, a content management system can identify that these items of content constitute a content match (e.g., a base content and a translated content which are corresponding). The content management system may thereafter generate content synchronization information, enabling a device of the user to read the base content while simultaneously outputting the translated content. Illustratively, the content management system may be implemented by one or more computing devices, which may, in some instances, include any computing device(s) associated with the user. The information regarding base and translated content may be obtained, for example, from network resources, such as an external data source that includes purchase information associated with a user or user account, and/or from information the user shares from a computing device, such a list of content available to the computing device.

In addition to identifying a content match, the content management system can also identify a computing device associated with the user that can synchronously present the base and translated content, such as the eBook reader or another computing device. A particular version of the content synchronization information may be transmitted to the identified device in order to be compatible with the companion content that is presented using the identified computing device and/or be compatible with identified computing device itself. For example, a different version of content synchronization information may be provided to an eBook reader versus a mobile phone, based on different formats used to visually present the text of an eBook. The identified computing device may already store the companion content or the content management system may cause at least a portion of the companion content to be transmitted to the identified computing device. The content management system can also cause content synchronization information to be transmitted to the identified device.

With the companion content and the content synchronization information available to one or more computing devices, the computing devices can synchronously present the companion content to provide the user with an enhanced content consumption experience. For instance, as described above, the user may read the Spanish eBook of *Don Quixote* while corresponding translated audio is output to the user or to other listeners and/or readers.

Though described herein with respect to translations of different languages, embodiments of the present disclosure may include translating between dialects of languages or different aspects of languages. For example, embodiments of the present disclosure may include consuming a British version of an eBook (in English) and synchronously outputting a corresponding Australian release of the eBook (also in English). As such, users may be enabled to output translated content in any dialect chosen. Further, in some embodiments, translated content may correspond to content in a number of alphabets. For example, embodiments of the present disclosure may include consuming an English language eBook and synchronously outputting a translated Japanese language eBook in Romanized Japanese (e.g., as written in the Latin alphabet), in Kanji, in Katakana, and/or in Hiragana. Further examples include consuming base content formatted in the Latin alphabet while synchronously outputting translated content in the Cyrillic alphabet. One skilled in the art will appreciate that translated content may include any combination of an alternate language, dialect, alphabet, or other distinguishing feature requiring translation.

Figure 1:
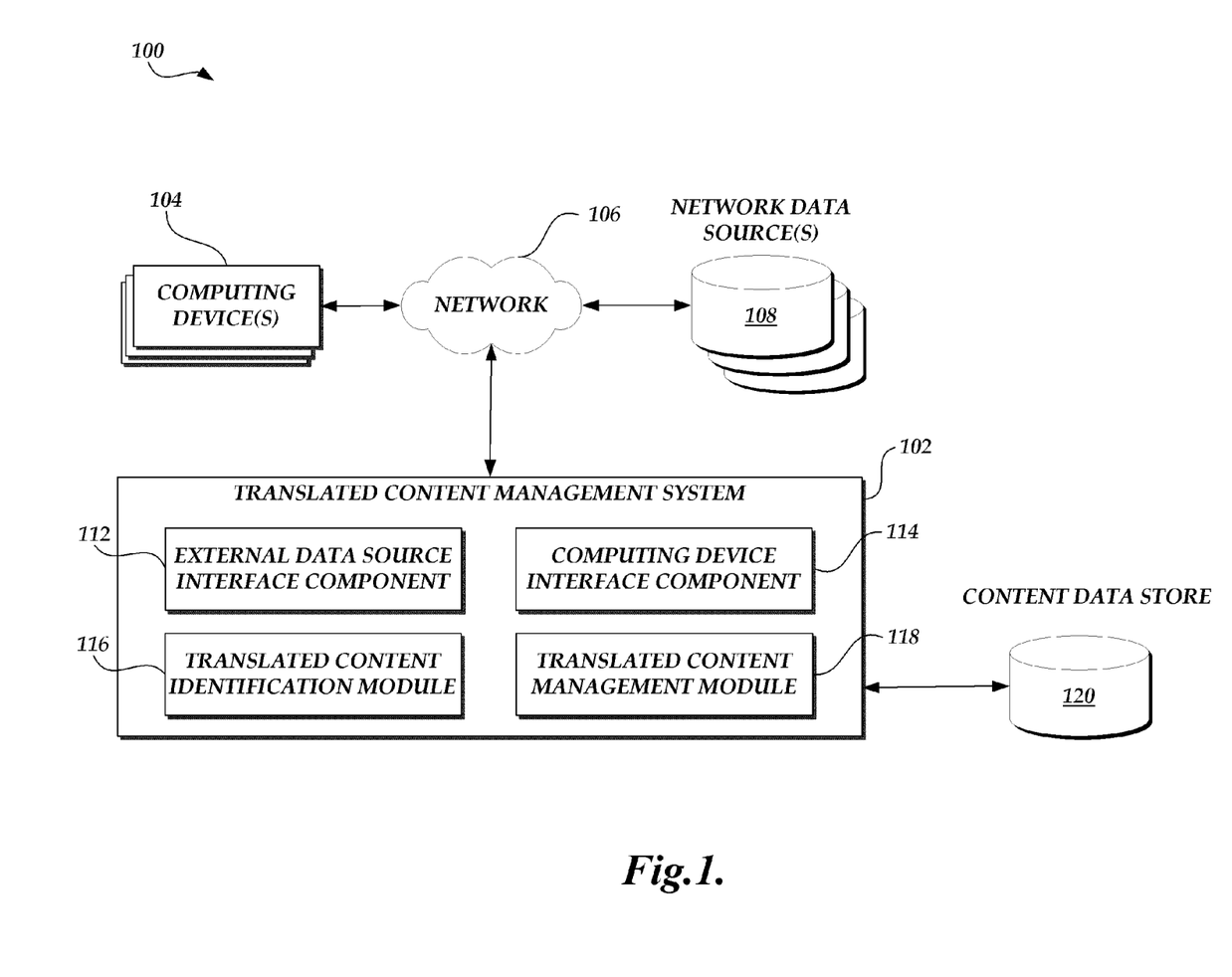
FIG. 1 is a block diagram depicting an illustrative companion identification environment for use in identifying companion content that can be synchronously presented.

With reference now to FIG. 1, a block diagram depicting an illustrative translated content management environment 100 for use in identifying translated content, generating content synchronization information, and managing content synchronization information will be described. As illustrated in FIG. 1, the content management environment 100 includes a translated content management system 102, one or more computing devices 104, and one or more network data sources 108 in communication via a network 106, as well as a content data store 120 in communication with the translated content management system 102 (e.g., via a network). The network 106, in addition to any of the networks described herein, may be any wired network, wireless network or combination thereof. In addition, any of the networks described herein may be a personal area network, local area network, wide area network, cable network, satellite network, cellular telephone network, etc., or any combination thereof.

As illustrated in FIG. 1, the content management environment 100 can include one or more computing devices 104 for presenting content to a user. In an illustrative embodiment, the computing devices 104 can include various hardware and/or software components for obtaining and presenting digital content to a user, including, but not limited to, browser software applications, image viewing software applications, electronic publication viewing software applications, media playing software applications, and the like. The computing devices 104 can correspond to a wide variety of devices or components that are capable of initiating, receiving or facilitating communications over a communication network and/or presenting content. The computing devices 104 can include, but are not limited to, a laptop, personal computer, a tablet computer, personal digital assistant (PDA), hybrid PDA/mobile phone, mobile phone, electronic book reader, digital media player, television, one or more processors, integrated components for inclusion in computing devices, appliances, electronic devices for inclusion in vehicles or machinery, gaming devices, and the like. One example of a computing device 104 will be described in more detail with respect to FIG. 3, below.

With continued reference to FIG. 1, the translated content management system 102 can include an external data source interface component 112, a computing device interface component 114, a translated content identification module 116, and a translated content management module 118. Illustratively, the external data source interface component 112 may be utilized for obtaining content information from network-based resources, such as the network data sources 108. Further, the computing device interface component 114 may be utilized for obtaining content information from computing devices 104. The content information obtained from the network data sources 108 and/or the computing devices 104 may include any information that can be used to identify a content match and/or a device to send content synchronization information. For instance, the content information may include information that identifies content, information associating content with a user or group of users, and/or information related to the content itself. By obtaining content information from different sources and/or at different points in time, the translated content management system 102 can be used to gather data related to decoupled content. In this way, the translated content management system 102 can identify relationships between decoupled content that may otherwise be unknown due to the decoupled nature of the content.

The content management system 102 can also include a translated content management module 118 for identifying a content match, identifying a computing device 104 to transmit content synchronization information to, and causing transmission of content synchronization information to one or more computing devices 104 via the network 106, or any combination thereof. The external data source interface component 112 and the computing device interface component 114 may be utilized to cause the transmission of information to the one or more network data sources 108 and/or one or more computing devices 104, respectively.

The translated content management system 102 can also include a translated content identification module 116 for processing the content information from the network data sources 108 and determining which contents are companion content that can be synchronized (e.g., a base content and one or more translated contents). The companion identification module 116 may use a product identifier and/or metadata (e.g., title, author, edition, etc.) related to a base content in order to determine other content which constitutes translated content. For instance, such information can be used to determine an English language eBook or audio book exists which corresponds to a Spanish language *Don Quixote* eBook. In some implementations, the translated content identification module 116 may further process the content information to identify translated content by applying filtering, spell/grammar check, and any other suitable automated algorithms. In addition, the translated content identification module 116 can incorporate additional reference materials to identify a content match, for instance, by accessing a uniform resource identifier. Further, the translated content identification module 116 may compare pairs or other combinations of content to determine whether each pair/combination constitutes companion content, for example, by correlating each pair/combination of content in a common format. More specifically, if the content information corresponds to information related to the presentation of a specific representation of content (e.g., an audio book), the translated content identification module 116 may translate at least a portion of the content into a format corresponding a different version of the content (e.g., translating audio into a specific eBook format) and/or into a generic format (e.g., text). The formatted content information can be correlated with other content information to determine whether each pair of content corresponds to companion content that can be synchronized. In other implementations, the translated content identification module 102 may prompt a user to enter data (e.g., title, author, edition, etc.) for one or more base contents. The translated content identification module 116 may compare the data in order to identify corresponding translated content. In yet other implementations, the translated content identification module 116 may prompt a user to confirm that the base and translated content are indeed translated content.

Those skilled in the art will appreciate that even though a base content and a translated content may be companion content, the base content may not correlate exactly to the translated content, even when properly translated. For example, the English language audio book of *Don Quixote* may not exhibit a one-to-one correspondence to the Spanish language eBook of *Don Quixote* due to differences between the narration script of the audio book and the text of the eBook, differences between editions, differences in "front matter" (e.g., introduction to the audio production, table of contents, index, etc.) and/or "back matter," differences between unabridged and abridged versions, differences in format of content, differences in device capabilities, differences introduced during translation, etc. Due to the existence of such uncorrelated portions of potential companion content, the translated content identification module 116 can be configured to identify translated companion content amongst pairs/combination of content that include mismatching portions. Although more detail will be provided below with reference to correlating portions of an Spanish version of an eBook with a translated English version of the corresponding audio book, the concepts described may be applied to any application in which a base and translated content include mismatching portions.

As noted above, when correlating an Spanish language version of an eBook with a translated English version of the corresponding audio book, mismatches can result from a number of sources, such as deletions, modifications, insertion of new material, or any combination thereof. Yet the translated English language version of the audio book may include large portions of unmodified material that, when translated accordingly, may strongly correlate with the Spanish language version of the eBook. Accordingly, in some embodiments, the translated content identification module 116 may detect mismatches between a base content and a translated content using algorithms that solve "longest common sequence" problems, an implementation of which can be found, for example, in the UNIX "diff" operation. The translated content identification module 116 can then generate content synchronization information for the correlated portions of the different versions and provide the content synchronization information to the user's computing device for use when synchronizing presentation of the English audio book with the Spanish eBook. More specifically, the translated content identification module 116 can correlate unmodified material similarly to how a Spanish language book and full or exact translation of the book into English may be correlated. This may include, for example, performing a translation on the text corresponding to the English audio book, and correlating the resultant text to the base content (e.g., the Spanish language eBook). One skilled in the art will appreciate that such techniques may involve translating one or both of a base content and a translated content to or from a desired language, such that both contents comply with one another and may be compared without translation. Further, such translation techniques may involve machine based translation or human translation.

For passages of a translated version with small-scale modifications, the translated content identification module 116 may correlate the modified material and generate an indicator that these portions include some mismatches. Although new and deleted material in the abridged version may not correlate with the full version, these uncorrelated passages and modified material can be handled so as to provide the most useful and natural user experience. This may include disabling a subset of synchronous presentation features and/or providing an indication of small scale mismatches. As a non-limiting example, when a user listens to the English audio book while viewing the Spanish eBook with synchronized highlighting of text, small scale modifications may be highlighted differently to indicate that audio playback does not completely match the written text. Similar techniques can be applied when correlating other potentially mismatching material, such as an unabridged base content with a companion unabridged translated content, as some material may not match between these versions.

An illustrative method that can be implemented by the translated content identification module 116 for processing mismatches will now be described in general terms. First, potential companion content (e.g., a base content and a translated content) can be converted into a common format, such as text and/or phoneme. Next, one or both items of content may be translated, such that the linguistic formats of both contents comply with one another (e.g. each is in a common language, dialect, alphabet, etc.). In some embodiments, machine translation techniques may be utilized for such translation. Then an attempt to match content at a small scale (e.g., at a word level) can be performed. Since missing or added passages can include larger portions (e.g., whole sentences or paragraphs) that do not match, a passage mismatch score indicating the frequency of mismatches can be computed for sentences, paragraphs, and/or other units of text. For example, the passage mismatch score may represent a number and/or percentage of word mismatches for a larger portion of text (e.g., a sentence, paragraph, or page). Sequences of larger portions with similarly high mismatch frequencies compared with adjoining sequences (where "high" can be set empirically from analyzing correlation of known companion content) can be identified. These sequences may represent content that should not be synchronized with other content in a translated content pair. The high mismatch passages can be removed in either or both contents, and matching can be reattempted at a smaller scale (e.g., at the word level). Metadata can be generated based on the correlation(s) to determine alignment points for the content synchronization information. The metadata may also include information identifying reference points in at least one of the companion content at which a matching portion begins/ends.

The translated content identification module 116 can also cause a notification to be sent in response to identifying companion content. For example, when new translated content becomes available (e.g., an English language *Don Quixote* audio book), a notification that companion content is available can be sent to users who already own corresponding base content (e.g., a Spanish language *Don Quixote* eBook). Such a notification can be sent, for example, via electronic mail, push notification, telephony message, automatic download request or any network messaging or communication protocol available between a computing device and the translated content identification module 116. The notification can be sent to a computing device that is configured to present content and/or that stores the corresponding content. This notification may be used by the computing device to inform and/or assist a user in obtaining the translated content via purchase (e.g., via a browser used to navigate an electronic shopping service that offers the translated content for sale), lending, sharing, and/or transfer of ownership services. Further, notifications, messages, and/or other communications regarding companion content can be sent in a variety of other contexts. Some example contexts can include a user browsing available content before the user has access to any of the companion content, and sending a user a promotional offer to sample companion content (e.g., a chapter of an English language audio book and a chapter of a corresponding Spanish eBook) to try a synchronous presentation experience.

Returning to FIG. 1, the translated content identification module 116 may also determine a match score indicative of how well a base content correlates with a translated content. The match score may apply to the entire base content and translated content or to a subset thereof (e.g., a chapter, act, or part). The match score may be indicative of the overall quality of synchronously presenting the companion content, while the passage mismatch score described above may be useful in synchronously presenting the companion content, for example, as will be described below with reference to FIG. 7. The match score may be calculated like the passage mismatch score described above. In some instances, the match score can correspond to a percentage or ratio of any unit of the base content correlating to a corresponding unit of the translated content. In a specific example, the match score can be the percentage of words in an eBook of a first language that correlate to corresponding words in an audio book of a second language. The match score may be used to determine whether pairs of content constitute companion content. For example, a minimum match score can be used as a threshold value for determining that a content pair constitutes companion content for which content synchronization information will be generated.

Since portions of a base content and a translated content may not correlate with each other, the match score can be used to process base content and a translated content with varying ranges of correlations into any number of groups that can be processed differently. For example, using the match score, the translated content identification module 116 may synchronize a Spanish language eBook with a corresponding English language audio book. Accordingly, the user's computing device can automatically present base content and a translated content synchronously when the match score satisfies a threshold and/or provide a subset of features related to synchronizing the base content and a translated content when the base content and a translated content has a match score below a predetermined threshold.

The translated content management system 102 can further be associated with the content data store 120 for storing content information obtained by the external data source interface component 122, utilized by the translated content identification module 116, and/or generated by the translated content identification module 116. The content data store 120 may store content information used to determine whether content pairs are companion content, data identifying companion content, and/or match scores. For instance, the companion data store may store a list, database, or other suitable data structure that identifies companion content as determined by the translated content management system 102.

The translated content management system 102 may be operable on one or more computing devices, such as virtual or physical server computing devices, cloud nodes, client computing devices, and/or mobile computing devices. Additionally, the external data source interface component 122 and/or the translated content identification module 116 may be implemented in a single computing device or across multiple computing devices. Likewise, although the content data store 120 is illustrated as local to the content management system 102, the data store 120 can correspond to a distributed data store and/or a network based data store. The translated content management system 102 may include any one of a number of additional hardware and/or software components that would be utilized in the illustrative computerized network environment to carry out the illustrative functions of the translated content management system 102 and/or any of the individually identified components.

Figure 2:
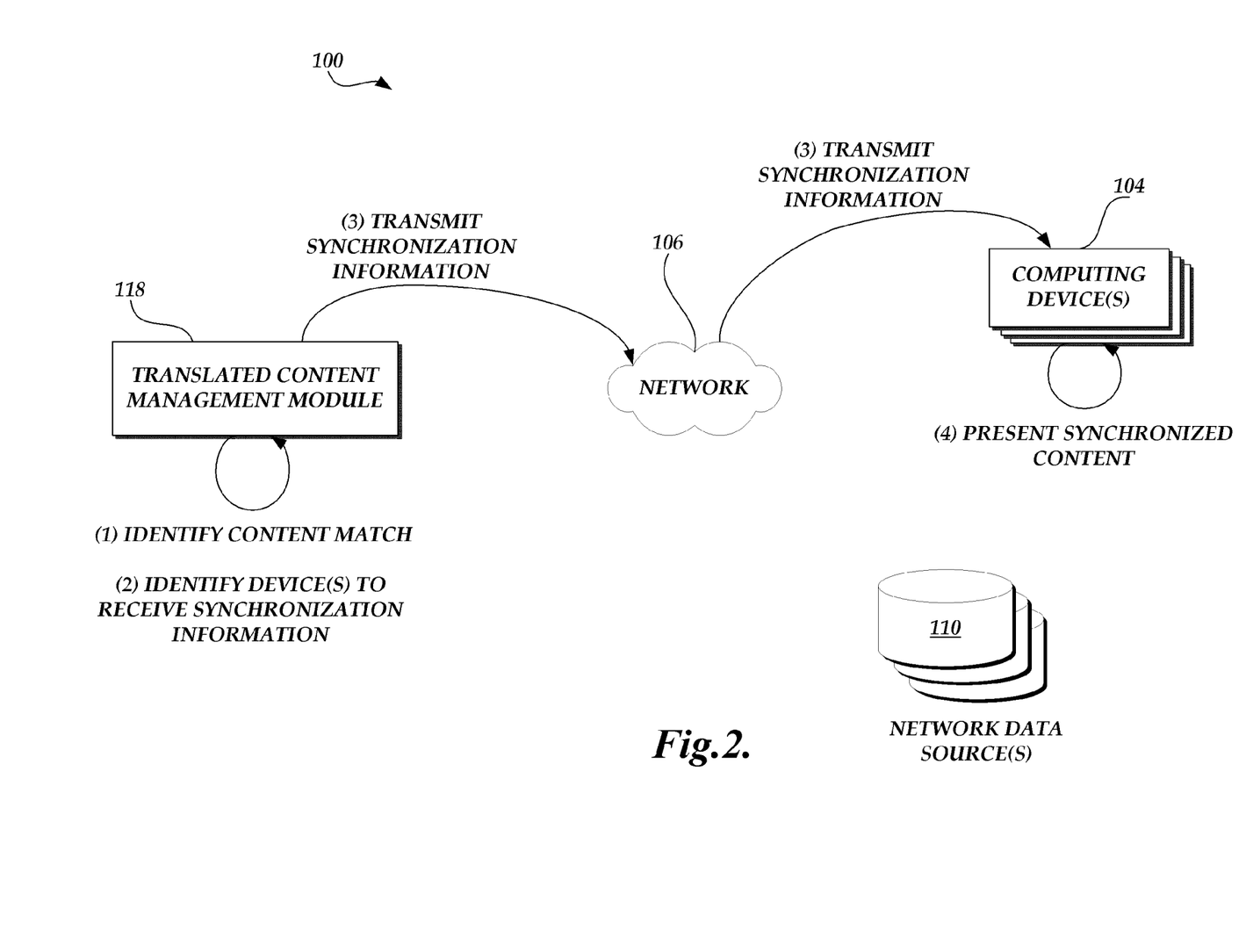
FIG. 2 is a block diagram depicting an illustrative translated content management environment for use in identifying translated content that can be synchronously presented, as well as for providing synchronization information regarding the translated content to one or more computing devices.

Referring to FIG. 2, once content information for decoupled content is available to the content management system 102, the content management module 116 can identify a companion content pair (e.g., a base content in a first language which corresponds with a translated content in a second language). Companion content pairs can be identified in response to gathering new content information. Companion content pairs may be identified at predetermined intervals of time (e.g., every day, week, etc.). Alternatively or additionally, companion content pairs can be identified from information available to the content management system 102 on demand in response to a user request or system generated event obtained via the network 106. For example, in some instances, a user may begin to consume a base content, and a translated content may be determined and/or presented to the user in real time or substantially real time.

The translated content management module 118 can identify companion content pair in a variety of ways. The translated content management module 118 may identify a companion content pair based on comparing metadata and/or a content identifier for each item of content associated with or owned at a particular time by a user to a list of companion content, for example, as generated by the translated content identification module 116. In some implementations, the translated content management module 118 can identify translated companion content pairs based on comparing match scores of potential content pairs (e.g., as computed by the translated content identification module 116) to a predetermined threshold. The translated content management module 118 may also identify whether pairs of content can be synchronized by correlating the digital representations of pairs of content.

After identifying a translated companion content pair, the translated content management module 118 may identify a receiving computing device 104 to receive synchronization information. The receiving computing device 104 may receive synchronization information without obtaining access to any portion of content of a companion content pair associated with the synchronization information and/or prior to obtaining access to any portion of content of a companion content pair associated with the synchronization information. In certain instances, the receiving computing device may request the content synchronization information. The receiving computing device may be associated with a user, user account, or group of users associated with the content match. For example, the translated content management module 118 can associate a user with the content match by identifying, using content information for the base and translated contents, that the user has access to both the base and the translated content. Further, as will be described in more detail below, the receiving computing device 104 may be configured to synchronously present the translated content in conjunction with consumption of the base content. In some implementations, one or more receiving computing devices 104 may synchronously present companion. For example, a number of computing devices 104 may output a number of translated contents which correspond to a base content read by yet another computing device 104. Illustratively, a user may read aloud a base content on computing device 104 while a number of listeners hear corresponding translated content via their own computing devices 104. The receiving computing device 104 may, in some instances, be determined based on available content synchronization information and/or compatibility with the receiving computing device 104. Still further, the receiving computing device 104 may locally store either or both of the base and translated content on memory or stream the content from one or more network resources, such as a network data source 110 or the translated content management system 102.

After receiving the synchronization information, the receiving computing device 104 can present translated content synchronously with consumption of a base content. Synchronously presenting translated content can include, for example, displaying the text of a corresponding translated eBook, or outputting the audio of a translated audio book. More details regarding presentation of synchronized translated content will be provided with reference to FIG. 4.

Figure 3:
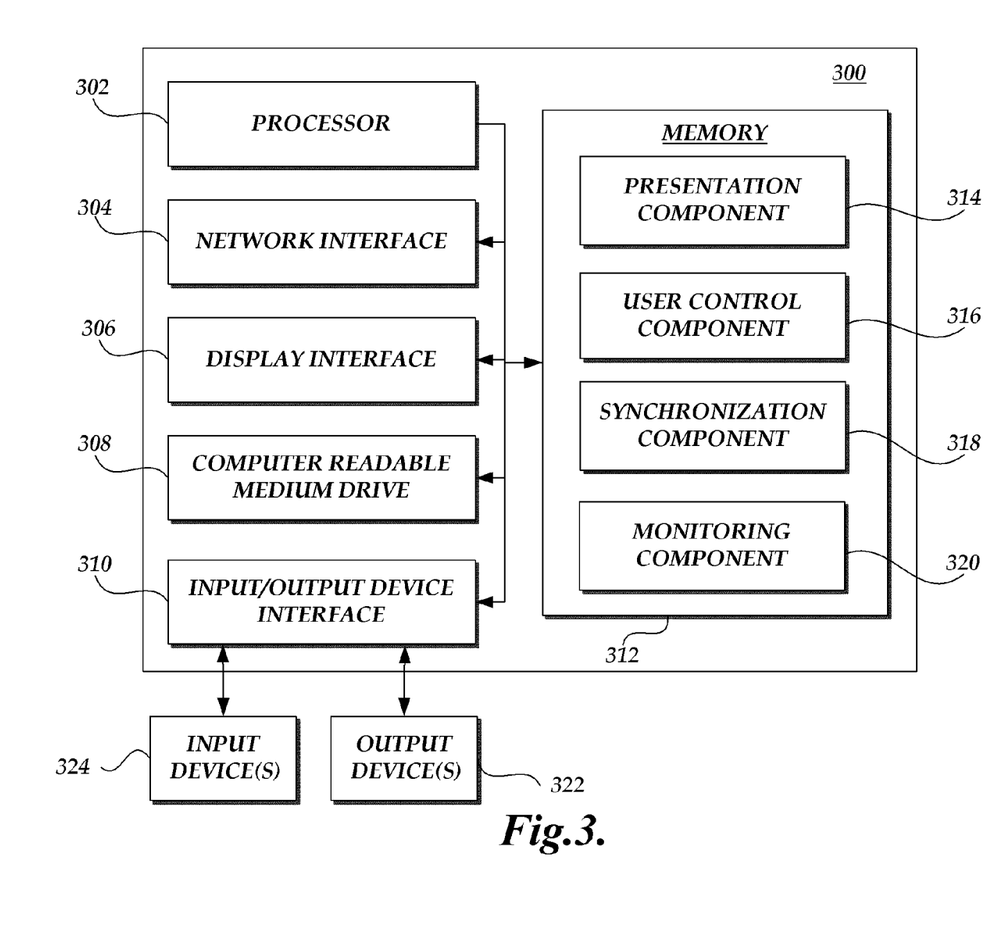
FIG. 3 is a block diagram depicting an illustrative embodiment of a computing device configured to implement synchronized playback of content.

FIG. 3 is a block diagram illustrating an embodiment of a computing device 300 configured to implement synchronized playback of content, such as computing device 104 of FIG. 1. The computing device 300 may have one or more processors 302 in communication with a network interface 304, a display interface 306, a computer readable medium drive 308, and an input/output device interface 310, all of which communicate with one another by way of a communication bus. The network interface 304 may provide connectivity to one or more networks or computing systems. The processor(s) 302 may thus receive information and instructions from other computing systems or services via a network. The processor(s) 302 may also communicate to and from memory 312 and further provide output information or receive input information via the display interface 306 and/or the input/output device interface 310. The input/output device interface 310 may accept input from one or more input devices 324, including, but not limited to, keyboards, mice, trackballs, trackpads, joysticks, input tablets, track points, touch screens, remote controls, game controllers, heart rate monitors, velocity sensors, voltage or current sensors, motion detectors, cameras, microphones, or any other input device capable of obtaining a position or magnitude value from a user. The input/output interface may also provide output via one or more output devices 322, including, but not limited to, display devices, one or more speakers or any of a variety of digital or analog audio capable output ports, including, but not limited to, headphone jacks, ¼ inch jacks, XLR jacks, stereo jacks, Bluetooth links, RCA jacks, optical ports or USB ports, as described above. The display interface 306 may be associated with any number of visual or tactile interfaces incorporating any of a number of active or passive display technologies (e.g., electronic-ink, LCD, LED or OLED, CRT, projection, etc.) or technologies for the display of Braille or other tactile information.

Memory 312 may include computer program instructions that the processor(s) 302 executes in order to implement one or more embodiments. The memory 312 generally includes RAM, ROM and/or other persistent or non-transitory computer-readable media. Memory 312 may store a presentation component 314 for managing the output of information to a display and/or other output device(s) 322 via the display interface 306 and/or input/output interface 310. The memory 312 may further include a user control component 316 for managing and obtaining user input information received for one or more input device 324 via the input/output device interface 310. In one embodiment, the user control component 316 may additionally interpret user input information in order to monitor playback of a base content.

Memory 312 may further store a monitoring component 320. In one embodiment, the monitoring component 320 may be utilized to monitor the current presentation of a base content, in order to facilitate synchronized output of translated content. In one embodiment, the monitoring component 320 may utilize a touch screen or other physical input of the computing device 300 to receive an indication of the current position of consumption of the base content. For example, a user utilizing the computing device 300 may use their finger to indicate a currently read word within a base content. As such, the computing device 320 may monitor the location of consumption of the base content. In another embodiment, the monitoring component 320 may monitor other aspects of presentation of a base content in order to determine a current consumption position. For example, the monitoring component 320 may calculate an average consumption speed based on the page turn rate associated with the base content. The monitoring component 320 may estimate the current consumption position of the base content based on the monitored page turn rate. In still more embodiments, the monitoring component 320 may utilize other inputs 324 of the computing device 300 in order to monitor a consumption location of a base content. For example, the monitoring component 320 may utilize a camera input device 324 to track the eye movement of a user. This eye movement may be used to estimate the word viewed on a display output device 324 by the user. As such, the monitoring component 320 may estimate the current consumption position of base content by determining the position of the currently read word within the base content. As a further example, an audio input device 324 may be used to determine a current consumption position of base content. For example, the monitoring component 320 may utilize a text to speech process to determine the last spoken word, sentence, etc. by a user. By locating the last spoken word within the base content, a current consumption position within base content may be determined.

In addition, memory 312 may store a synchronization component 318. In one embodiment, the synchronization component 318 may interpret a synchronization file obtained from a local or network storage location (not shown) in order to maintain synchronization between base content and translated content. In one embodiment, the synchronization file contains content synchronization information associated with the companion content, and can be generated, transmitted, and/or obtained via computing devices in a communication network, such as from the translated content management system 102 of FIG. 1. As described above, the content synchronization information can include any data related to the synchronous presentation of the first content and the second content, so as to enable one or more computing devices to synchronously present companion content. Content synchronization information can include reference points mapping portions of the first content to corresponding portions of the second content. In a specific example, content synchronization information can include data that can be used to map a segment of text (e.g., a word, line, sentence, etc.) to a timestamp of a corresponding translated audio recording or textual content. The content synchronization information can also include information related to the relative progress of the presentation, or a state of presentation of the digital representation of the content. The synchronous presentation of the companion content can vary as a function of the capabilities and/or configuration of the device (e.g., an eBook reader vs. a mobile phone) and/or the formats of the content in the content pair (e.g., a digital publication and an audio recording vs. a video and an audio recording). Accordingly, the content synchronization information can be generated in a variety of formats, versions, etc. In addition, the content synchronization information can include any combination of features or data used to synchronize content disclosed in the '313 application.

Though described above as a computing device which received information via a network (e.g., from a translated content management system 102 of FIG. 1), in some embodiments, a computing device 300 may include additional or alternative components which implement one or more of the functionalities of the translated content management system 102. As such, in some embodiments, a computing device 300 may not require connection to an external data source in order to implement embodiments of this disclosure.

Figure 4:
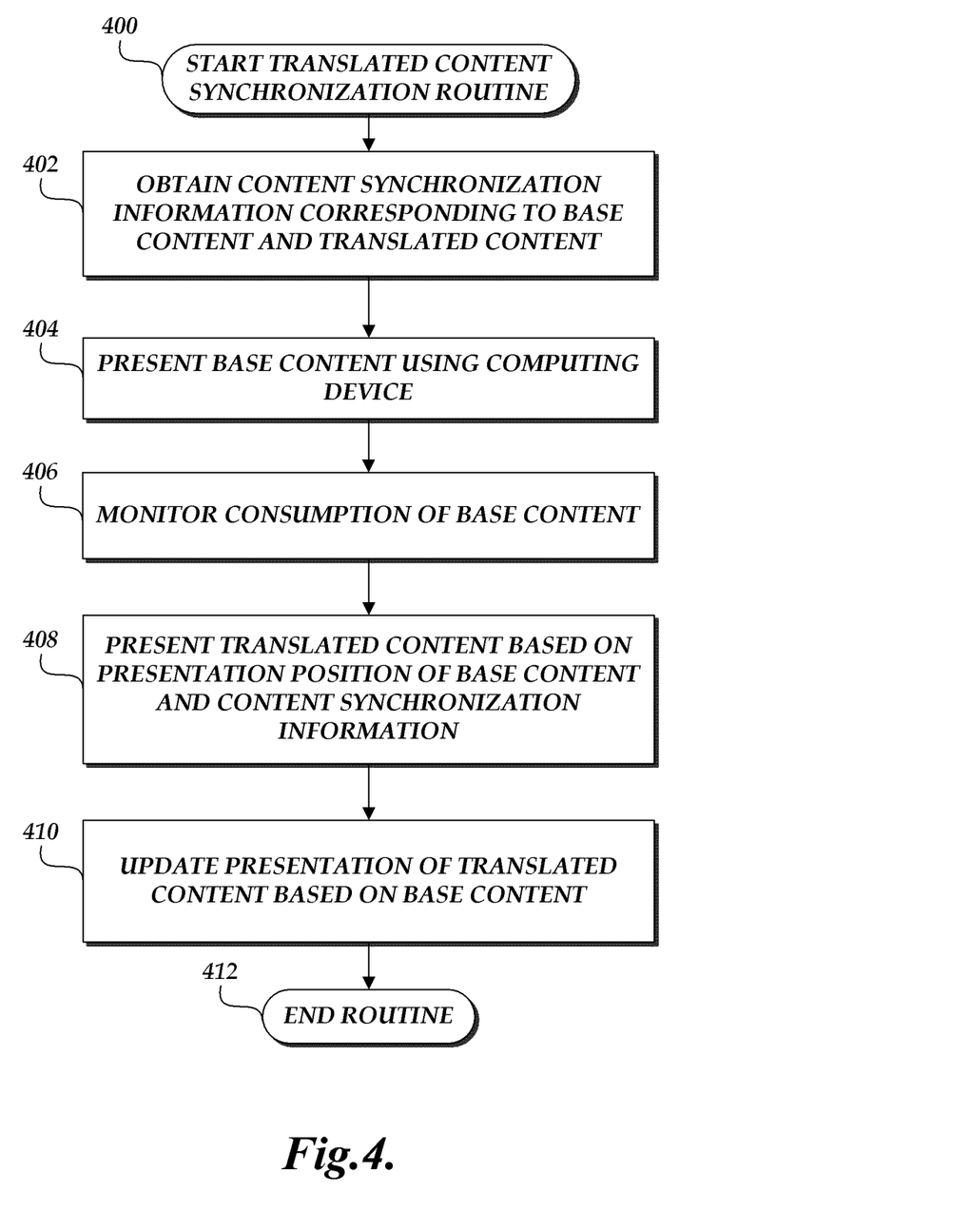
FIG. 4 is a flow diagram of an illustrative method of presenting synchronized content.

Referring to FIG. 4, a flow diagram of an illustrative method 400 for synchronously presenting translated content will be described. The method 400 may be utilized, for example, by the computing device 300 described with respect to FIG. 3, above. At block 402, a computing device 300 can obtain content synchronization information corresponding to a base content and a translated content. The content synchronization information may be obtained, for example, from a data store (e.g., data store 110) and/or a separate computing device. Alternatively or additionally, the content synchronization information may be obtained by the computing device 300 generating the content synchronization information. As previously described, the content synchronization information can include information regarding positions in the base content that correspond to positions in a translated content (e.g., a page and line in an eBook of a first language and a presentation position of a corresponding translated audio book), information identifying portions of the base and translated content that match/mismatch (e.g., information identifying portions of an unabridged Spanish eBook that do not correspond to an abridged translated audio book), or any combination thereof.

At block 404, the computing device 300 may proceed to output the base content. The base content can be presented in any manner that the computing device 300 is capable of presenting content, such as visually, aurally, tactilely (e.g., via mechanical vibrations and/or by presenting Braille), or any combination of thereof. The base content may be any type of content described herein, for example, an eBook. Further, the base content may include only a portion of a work, for example, a chapter of an eBook.

At block 406, a computing device 300 can begin monitoring a consumption of the base content (e.g., reading of the base content by a user). Monitoring of consumption may be utilized in order to determine a presentation position of the base content. The presentation position may be a reference point or tracking point associated with the base content. For example, the presentation position may represent a textual position and/or any other indicator of a position of the base content that is being read or consumed by a user of the device. As described above with respect to FIG. 3, the presentation position may be obtained by monitoring physical input by a user, page turns of the base content, eye movement of the user, or spoken words of the user. The presentation position of the base content can used in combination with content synchronization information to determine a corresponding presentation position in the translated content. For example, the content synchronization information may be used to map a presentation position of the base content to a corresponding presentation position in the translated content. In some instances, the content synchronization information can include a map of reference points in the base content that correspond with reference points in the translated content, which can be used to determine a presentation position in the translated content.

The translated content can be synchronously presented with the base content based on the presentation position of the base content and the content synchronization information at block 408. Like the base content, the translated content can be any of the content described herein and presented in any manner that a computing device 300 is capable of presenting the translated content, such as visually, aurally, tactilely, or any combination of thereof. The translated content may be, for example, a English language audio book corresponding to the base content. In addition, the translated content may include only a portion of a work, for example, a chapter of an audio book. In some instances, the translated content can be presented using the same computing device used to present the base content. In other instances, the translated content is presented using a separate computing device in communication with the computing device that presents the base content. For example, a first computing device 300 may monitor the consumption of a Spanish language eBook by a first user, while additional computing devices 300 play a translated English audio book, or displays a translated English language eBook.

At block 410, the presentation position of the translated content can be updated based on a presentation position of the base content. For example, as the presentation position of the base content changes (e.g., by reading the book), the computing device 204 can determine a corresponding presentation position for the translated content using the synchronization information. Based this determination, the presentation position of the translated content can be synchronized with the presentation position of base content. In a specific example, this may include turning the page of a translated eBook (e.g., displayed on a second computing device 300 of a second user) when a first user of a first computing device has advanced beyond the text associated with the page (e.g., when the first user turns the corresponding page of a base content). The presentation position of the translated content can be continually updated based on the presentation position of the base content to enable an enhanced user experience of synchronously consuming the base content and the translated content. When the base content and/or the translated content include only a portion of a work, the computing device 300 can disable synchronous presentation of companion content for portions of the base content and translated content that content synchronization information indicates do not correspond to each other.

In some embodiments, updating the presentation of translated content may include modifying the speed of output of the translated content. For example, where the base content is a Spanish language eBook, and the second content is a corresponding English language audio book, the speed of the reader of the eBook may differ from the narration speed of the audiobook. As such, presentation of the audio book may be modified in order to match the reading speed of the reader of the eBook. This may include increasing or decreasing the speed of output of the audio book. In some embodiments, the pitch of the audio book may be maintained regardless of speed, such that the listening experience of the user is not impacted.

Further, in some embodiments, thresholds may be established, such that the speed of playback of a translated content is only modified if the difference between consumption of the base content and playback of the translated content exceeds the threshold. These thresholds may correspond to a length of time to playback the translated content between the current presentation position of the translated content and the current presentation position of the base content (e.g., the translated content may be X seconds behind the base content). Though described here in terms of time, additional thresholds may be applied to the number of words separating translated content and base content, or any other feature of either the translated content or base content. Some examples of systems and methods for modifying the presentation of a second content (e.g., translated content) based on presentation of a first content (e.g., a base content) may be found in the '422 application.

Figure 5:
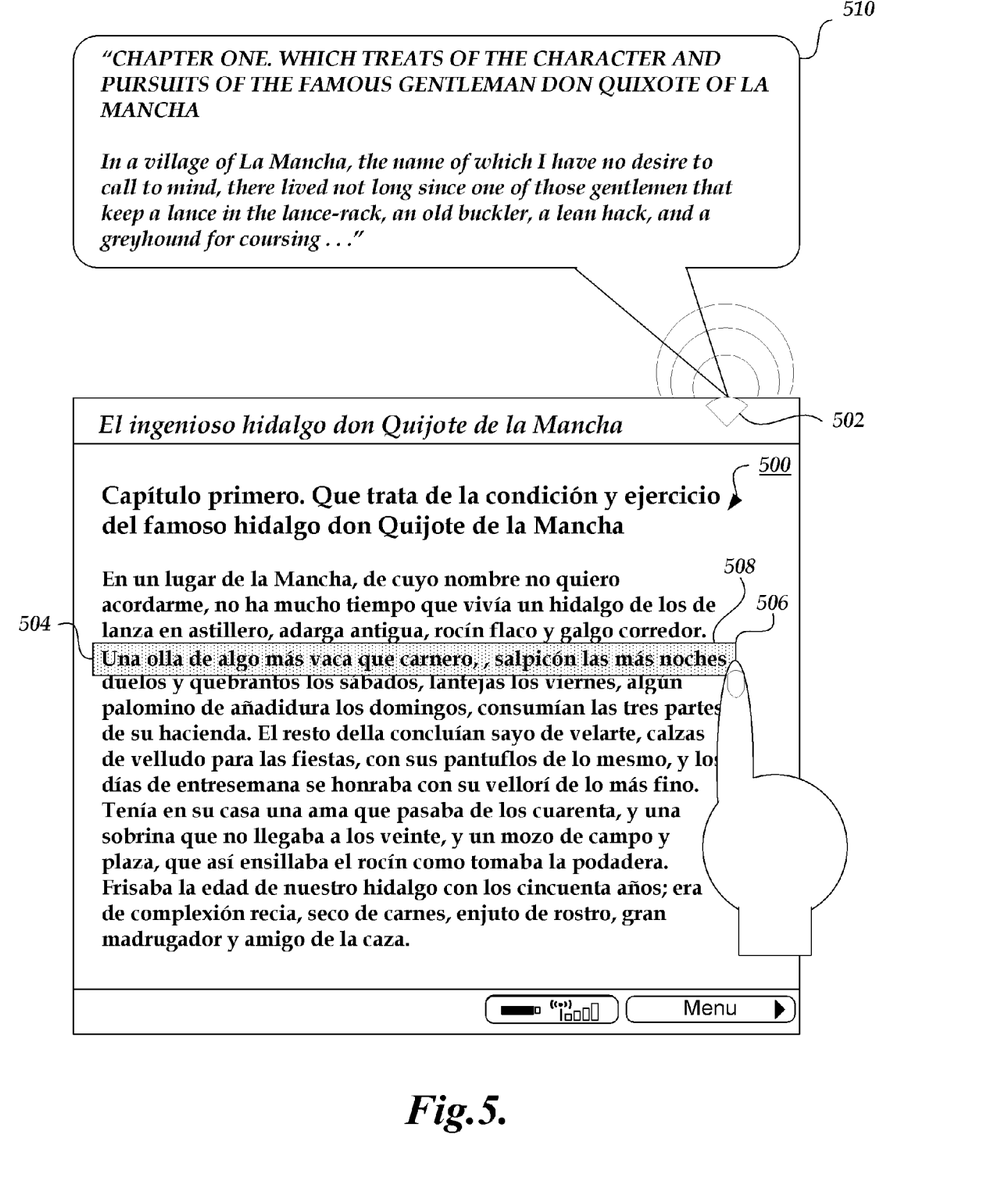
FIG. 5 depicts an illustrative control interface that may be used to manage synchronized playback of content.

With reference to FIG. 5, an illustrative control interface 500 is depicted that may be used to manage synchronized presentation and output of a base content and a translated companion content (e.g., a Spanish eBook and a corresponding English audio content). For purposes of illustration, the control interface 500 may be generated for display on a computing device, such as the computing device 300 discussed with reference to FIG. 3, above. The computing device 300 may include one or more output devices 322 represented in FIG. 5 by icon 502 that are capable of audio output. Such output devices may include one or more speakers or any of a variety of digital or analog audio capable output ports, including, but not limited to, headphone jacks, ¼ inch jacks, XLR jacks, Bluetooth links, stereo jacks, RCA jacks, optical ports or USB ports.

As shown in FIG. 5, the control interface 500 displays a portion of the Spanish language eBook *Don Quixote*. Similarly, the computing device 300 may output corresponding translated content 510, which corresponds to the currently read portion of the Spanish language eBook *Don Quixote*. Specifically, the control interface 500 includes a representation 504 of an advancing position in textual content which corresponds to a current position in the translated audio content as the audio content is played back. Illustratively, the representation 504 of an advancing position may correspond to the beginning of a block 508 of highlighted text. In other embodiments, the representation 504 of an advancing position may take any form, and may be displayed visually or through a tactile interface. For example, the representation 504 of an advancing position in the textual content may be indicated by a visible or tactile cursor, line, selection, animation, or any other type of emphasis.

The representation 504 of an advancing position in the textual content may be updated as the current position in the translated audio content advances during playback in order to maintain synchronization between the companion textual and audio content. In one embodiment, the representation 504 of an advancing position in the textual content may indicate the beginning, the end, or any other location within a word or sentence currently being output by the output device(s) 322. In another embodiment, a representation 504 of an advancing position in the textual content may indicate a syllable of a word currently being output by the output device(s) 322. In still further embodiments, a representation 504 of an advancing position in the textual content may indicate an entire word or sentence, or may indicate a word or sentence a fixed distance away from a word, syllable, or sentence being currently being output by the output device(s) 322.

The control interface 500 may additionally include a representation 506 of the current reading position of the user, based on monitoring input. In the currently illustrated example, the location 506 may be determined based on touch input by the user, and may be represented by an end of a block 508 of highlighted textual content. In various other embodiments, the control interface 500 may display the representation 506 of the location of the pointer to the textual content through any visual or tactile cue, cursor, or other type of emphasis (e.g., in situations where the currently read position is obtained by eye tracking or voice recognition).

The control interface 500 may include a block 508 of highlighted textual content or other indicator to represent a lead interval such as the interval between the representation 504 of the current playback position of translated content and the representation 506 of the current reading position of the base content. In one embodiment, a formatting change, a change in an attribute of audio or other content being output, or any other visual, aural, or tactile cue may be used to represent the lead interval. In another embodiment, a lead interval may be represented as a numerical value or may be indicated by reproducing the textual content captured in the interval (e.g., the textual content within the block 508) at an alternate location on the screen.

As discussed above with respect to FIG. 4, the computing device 300 may change the speed at which synchronized translated audio and textual content are output and displayed based on the lead interval indicated by the block 508 of highlighted textual content. For example, the output speed of the translated audio content may be increased if the lead interval exceeds a defined threshold, or reduced if the lead interval drops below a defined threshold. Further examples of modification of output speed of a content are described in more detail with respect to the '422 application.

One skilled in the relevant art will appreciate that the illustrative interface described above is provided for purposes of example only, and that embodiments of the interface may implement any number or combination of the features described with reference to FIG. 5. The particular combination or functionality of features comprising a control interface such as the illustrative control interface 500 of FIG. 5 may be predefined by a user or computing device 300, determined by a remote service, or dynamically determined by the computing device 300 based on past observations of user behavior. Control interface 500 may be implemented on any number of devices as described above with reference to FIG. 3.

Although some of the examples were provided in the context of a retail environment in which a user purchases companion content, any combination of features described herein may be applied to other settings, as appropriate. For example, the user need not purchase content of a companion content pair in order to obtain content synchronization information and/or synchronously consume a base and translated content. Instead, the user may obtain access to one or more individual content of a companion content pair by any number of suitable ways, for example, by borrowing, checking out, renting, permanently leasing, temporarily leasing, or any combination thereof. In a specific example, the user may check out an English language audio book and synchronously present the audio book while reading the corresponding Spanish language eBook that the user has purchased. In another specific example, the user may lease an audio book and synchronously present the audio book with a borrowed eBook.

Further, although some of the examples were provided in the context of synchronously presenting content, any combination of features described herein may be applied to other content synchronization, as appropriate. For example, content synchronization information can be used to switch back and forth between presenting a base content and a translated content.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for synchronizing output of translated content during consumption of base content, the system comprising:
  one or more data stores that store:
    a base content;
    translated content corresponding to the base content, wherein the translated content differs from the base content by at least one of language, dialect, or alphabet; and
    content synchronization information that identifies:
      one or more positions within the base content, and
      for each of the one or more positions within the base content,
      a corresponding position within the translated content;
  at least one input device configured to at least receive user interaction information during consumption of the base content, the user interaction information relating to interaction by a user with the base content during consumption of the base content;
  at least one output device configured to at least output the base content and the translated content; and
  at least one processor in communication with the one or more data stores, the at least one input device, and the at least one output device, the at least one processor configured to at least:

cause output of the base content via the at least one output device;

analyze the user interaction information to detect a current position of consumption of the base content, wherein the current position of consumption advances during consumption of the base content;

determine that the content synchronization information identifies a first position within the base content that corresponds to the current position of consumption of the base content;

identify, based at least in part on the content synchronization information, a first position within the translated content that corresponds to the first position within the base content;

cause synchronization of output of the base content and output of the translated content from the current position of consumption of the base content and the first position within the translated content; and maintain, based at least in part on the content synchronization information, synchronization of the output of the base content and the output of the translated content as the current position of consumption of the base content advances during consumption of the base content.

2. The system of claim 1, wherein the at least one processor is configured to at least maintain synchronization of the output of the base content and the output of the translated content by repeatedly:

determining that the current position of consumption has advanced during consumption of the content;

determining that the content synchronization information identifies a next position within the base content that corresponds to the current position of consumption as advanced;

identifying, based at least in part on the content synchronization information, a next position within the translated content that corresponds to the next position within the base content; and causing synchronization of the output of the base content and the output of the translated content from the current position of consumption of the base content as advanced and the next position within the translated content.

3. The system of claim 1, wherein the current position of consumption of the base content is monitored based at least in part on at least one of touch input, page turns, eye movement, or voice recognition.

4. The system of claim 1, wherein the at least one input device comprises at least one of a touch screen, a mouse, a stylus, a remote control, a game controller, a motion detector, a camera, and a microphone.

5. The system of claim 1, wherein the at least one processor is further configured to at least:

determine that the current position of consumption of the base content has advanced during consumption of the content;

determine a lead interval based at least in part on a difference between the current position of consumption of the base content as advanced and a current position of the output of the translated content; and modify a speed of the output of the translated content based at least in part on the lead interval.

6. The system of claim 1, wherein the user interaction information comprises at least one of a touch input location, spoken word, page turn, or eye movement, and wherein analyzing the user interaction information to detect a current position of consumption of the base content comprises identifying, as the current position of consumption, a position within the base content that corresponds to user interaction information.

7. The system of claim 1, wherein the user interaction information comprises a frequency of page turns within the base content, and wherein analyzing the user interaction information to detect a current position of consumption of the base content comprises estimating the current position of consumption of the base content based at least in part on a frequency of page turns within the base content.

8. The system of claim 1, wherein the user interaction information comprises user input corresponding to a magnitude, and wherein analyzing the user interaction information to detect a current position of consumption of the base content comprises calculating the current position of consumption based at least in part on a previously detected position of consumption and the user input corresponding to the magnitude.

9. A computer-implemented method for providing content synchronization information regarding a base content and a corresponding translated content, the computer-implemented method comprising:

as implemented by one or more computing devices configured with specific executable instructions, identifying a content match indicating that a base content can be synchronized with a corresponding translated content;

identifying at least one device to receive the content synchronization information, the content synchronization information identifying one or more positions within the base content and a position within the translated content corresponding to each of the one or more positions within the base content, the at least one device configured to at least:

store the base content and the translated content, determine that the content synchronization information identifies a position within the base content that corresponds to a current position of consumption of the base content, and output the translated content synchronously with the base content from the position within the translated content corresponding to the position within the base content and the current position of consumption of the base content; and transmitting of the content synchronization information from the data store to the device via a network.

10. The computer-implemented method of claim 9, wherein the at least one device comprises a first device storing the base content and at least one second device storing the translated content, wherein the first device is configured to at least monitor the current position of consumption of the base content as the current position of consumption changes, and wherein the at least one second device is configured to at least output the translated content synchronously with the base content based at least in part on the current position of consumption as the current position of consumption changes.

11. The computer-implemented method of claim 9, wherein the base content comprises at least one of an audio book or an eBook.

12. The computer-implemented method of claim 9, wherein the translated content comprises at least one of an audio book or an eBook, and wherein the translated content differs from the base content in at least one of language, dialect, or alphabet.

13. The computer-implemented method of claim 9 further comprising generating the content synchronization information in response to identifying the content match.

14. The computer-implemented method of claim 9 further comprising determining a match score for the content match, the match score indicating how well the base content can be synchronized with the corresponding translated content.

15. A computer-implemented method for synchronizing output of translated content corresponding to a translation of a base content during consumption of the base content, the computer-implemented method comprising:
   causing output of the base content;
   monitoring a current position of consumption of the base content based at least in part on at least one input device, wherein the current position of consumption of the base content changes during consumption of the base content;
   determining that content synchronization information associated with the base content and the translated content identifies a position within the base content that corresponds to the current position of consumption of the base content, wherein the content synchronization information identifies one or more positions within the base content and, a position within the translated content that corresponds to each of the one or more positions within the base content; and
   causing synchronization of output of the base content and output of the translated content from an output position of the translated content that is synchronized to the current position of consumption of the base content based at least in part on the content synchronization information.

16. The computer-implemented method of claim 15 further comprising modifying an output speed of the translated content based at least in part on determining a difference between the current position of consumption of the base content and a current output position of the translated content.

17. The computer-implemented method of claim 15 further comprising determining a lead interval reflecting the difference between the current position of consumption of the base content and the current output position of the translated content.

18. The computer-implemented method of claim 17 further comprising indicating the lead interval by causing output of at least one of a visual cue, an auditory cue, and a tactile cue.

19. The computer-implemented method of claim 18, wherein the base content comprises text, and wherein the visual cue comprises highlighting a position in the text that corresponds to the current output position of the translated content.

20. The computer-implemented method of claim 15, wherein output of the base content and output of the translated content are performed by the same computing device.

21. The computer-implemented method of claim 15, wherein output of the base content and output of the translated content are performed by different computing devices.

22. A system for providing synchronization information regarding a base content and a translated content, the system comprising:
   a data store configured to at least store content information; and
   one or more computing devices in communication with the data store, the one or more computing devices configured to at least:
      identify a content match based at least in part on the content information, the content match indicating that a base content and a translated content can be synchronized, wherein the translated content corresponds to a translation of the base content;
      obtain synchronization information related to the content match, wherein the synchronization information identifies one or more positions within the base content and a position within the translated content corresponding to each of the one or more positions within the base content;
      identify a device to receive the synchronization information; and
      cause transmission of the synchronization information to the device, wherein the synchronization information is used by the device to:
         determine that the synchronization information identifies a position within the base content that corresponds to a current position of consumption of the base content, and
         output the translated content synchronously with output of the base content from the position within the translated content corresponding to the position within the base content and the current position of consumption of the base content.

23. The system of claim 22, wherein the content information is associated with a translation of the base content to conform with the translated content.

24. The system of claim 22, wherein the content information is associated with a translation of the translated content to conform with the base content.

25. The system of claim 22, wherein the content match is identified automatically or at the direction of a user.

26. The system of claim 22, wherein the one or more computing devices are further configured to at least determine a match score of the base content and the translated content, and wherein the match score is indicative of how well the translated content correlates to the base content.

27. A non-transitory computer readable medium having at least one computer-executable component for synchronizing output of translated content corresponding to a translation of a base content during consumption of the base content, the at least one computer-executable component comprising:
   a translated content management component configured to at least:
      cause output of the base content;
      determine a current position of consumption of the base content based at least in part on input from at least one input device, wherein the current position of consumption changes during consumption of the base content;
      determine that synchronization information identifies a first position within the base content that corresponds to the current position of consumption of the base content, wherein the synchronization information identifies one or more positions within the base content and a position within the translated content corresponding to each of the one or more positions in the base content; and
      cause output of the translated content in synchronization with output of the base content from the current position of consumption of the base content and a first position within the translated content corresponding to the first position within the base content.

28. The non-transitory computer readable medium of claim 27, wherein the translated content management component is further configured to at least:
   determine, based at least in part on the input from the at least one input device, that the current position of consumption of the base content has changed during consumption of the content;

determine that the synchronization information identifies a second position within the base content that corresponds to the current position of consumption of the base content as changed; and modify a speed of the output of the translated content based at least in part on a difference between the second position within the base content and a current output position of the translated content.

29. The non-transitory computer readable medium of claim 27, wherein the base content and the translated content are output by a single computing device.

30. The non-transitory computer readable medium of claim 27, wherein the base content is output by a first computing device, and wherein the translated content is output by a second computing device.

31. The non-transitory computer readable medium of claim 27, wherein the translated content management component is further configured to at least update a current output position of the translated content in response to a determination that the current position of consumption of the base content has changed.

32. The non-transitory computer readable medium of claim 27, wherein determining the current position of consumption of the base content is based at least in part on monitoring at least one of touch input, page turns, eye movement, or voice recognition.

* * * * *